US007228387B2

(12) United States Patent
Cai et al.

(10) Patent No.: US 7,228,387 B2
(45) Date of Patent: Jun. 5, 2007

(54) APPARATUS AND METHOD FOR AN ADAPTIVE MULTIPLE LINE PREFETCHER

(75) Inventors: Zhong-Ning Cai, Lake Oswego, OR (US); William G. Auld, Portland, OR (US); Jeffrey D. Gilbert, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 285 days.

(21) Appl. No.: 10/611,619

(22) Filed: Jun. 30, 2003

(65) Prior Publication Data

US 2004/0268050 A1    Dec. 30, 2004

(51) Int. Cl.
*G06F 12/00* (2006.01)
(52) U.S. Cl. .................... 711/137; 711/167; 711/213
(58) Field of Classification Search ................ None
See application file for complete search history.

(56) References Cited

U.S. PATENT DOCUMENTS

| 2004/0049641 | A1* | 3/2004 | So et al. ................ 711/137 |
| 2004/0148470 | A1* | 7/2004 | Schulz ................... 711/137 |
| 2004/0205298 | A1* | 10/2004 | Bearden et al. .......... 711/137 |

* cited by examiner

*Primary Examiner*—Hyung Sough
*Assistant Examiner*—Kaushik Patel
(74) *Attorney, Agent, or Firm*—Blakely, Sokoloff, Taylor & Zafman LLP

(57) ABSTRACT

A method and apparatus for adaptive multiple line prefetching. In one embodiment, the method includes the identification of a prefetch depth. As described herein, a prefetch depth may refer to a number of memory lines to be prefetched to temporary (cache) memory. Once the prefetch depth is identified, prefetching is performed according to the identified prefetch depth. During the prefetching, the prefetching is adjusted as changes in the prefetch depth are detected. Accordingly, the dynamic adaptive multi-line prefetching mechanism described herein promotes higher system performance by the use of a more efficient prefetching mechanism.

25 Claims, 10 Drawing Sheets

COMPUTER SYSTEM 100

APPARATUS AND METHOD FOR AN ADAPTIVE MULTIPLE LINE PREFETCHER

FIELD OF THE INVENTION

One or more embodiments of the invention relate generally to the field of instruction/data prefetching. More particularly, one or more of the embodiments of the invention relates to a method and apparatus for adaptive multiple line prefetching.

BACKGROUND OF THE INVENTION

Modern computer systems exhibit a significant bottleneck between processors and system memory. As a result, a substantial amount of latency is incurred for completion of memory requests issued by a processor. One technique for reducing or avoiding latency between the processor and system memory is the use of data caches. As a result, computer systems may store requested data within volatile memory devices, such as cache memory devices. Accordingly, when a processor requires memory, the processor checks the data cache to determine whether the data is readily available and gather the data from such temporary memory devices to avoid the bottleneck that exists between processors and system memory.

Unfortunately, current computer systems consume an inordinate percentage of execution cycles solely on data cache. As a result, the program is halted until the data can be gathered from main memory. Unfortunately, substantial cache misses have a significant detrimental effect on the execution time and efficiency of user programs. One technique for reducing the amount of time required to process memory references is data prefetching. Data prefetching refers to a technique which attempts to predict or anticipate data loads. Once the data loads are anticipated, the data is preloaded or prefetched within a temporary memory in order to avoid data cache misses.

Accordingly, traditional instruction on data prefetching mechanisms focus on requested address patterns. These prefetch mechanisms aim to accurately predict which memory lines will be requested in the future based on what has been recently requested. However, prefetching can rapidly increase memory subsystem usage. The relationship between system memory, access latency and high memory subsystem usage negatively impacts the prefetching mechanism's effectiveness. In some symmetric multiprocessor (SMP) systems as well as chip multiprocessor (CMP) systems, aggressive prefetching drives up the memory subsystem usage, thereby increasing latency to the point that system performance is below non-prefetching levels. Therefore, there remains a need to overcome one or more of the limitations in the above-described existing art.

BRIEF DESCRIPTION OF THE DRAWINGS

The various embodiments of the present invention are illustrated by way of example, and not by way of limitation, in the figures of the accompanying drawings and in which.

DETAILED DESCRIPTION

A method and apparatus for adaptive multiple line prefetching is described. In one embodiment, the method includes the identification of a prefetch depth. As described herein, a prefetch depth may refer to a number of memory lines to be prefetched to temporary (cache) memory. Once the prefetch depth is identified, prefetching is performed according to the identified prefetch depth. During the prefetching, a change in the prefetch depth may be detected. In one embodiment, the prefetch depth is adjusted (increased/decreased) according to a detected memory subsystem response level. In response, subsequent data prefetching is performed according to the adjusted prefetch depth, Accordingly, the dynamic adaptive multi-line prefetching mechanism described herein promotes higher system performance by the use of a more efficient prefetching mechanism.

In the following description, numerous specific details such as logic implementations, sizes and names of signals and buses, types and interrelationships of system components, and logic partitioning/integration choices are set forth in order to provide a more thorough understanding. It will be appreciated, however, by one skilled in the art that the invention may be practiced without such specific details. In other instances, control structures and gate level circuits have not been shown in detail in order not to obscure embodiments of the invention. Those of ordinary skill in the art, with the included descriptions, will be able to implement appropriate logic circuits without undue experimentation.

System

Figure 1:
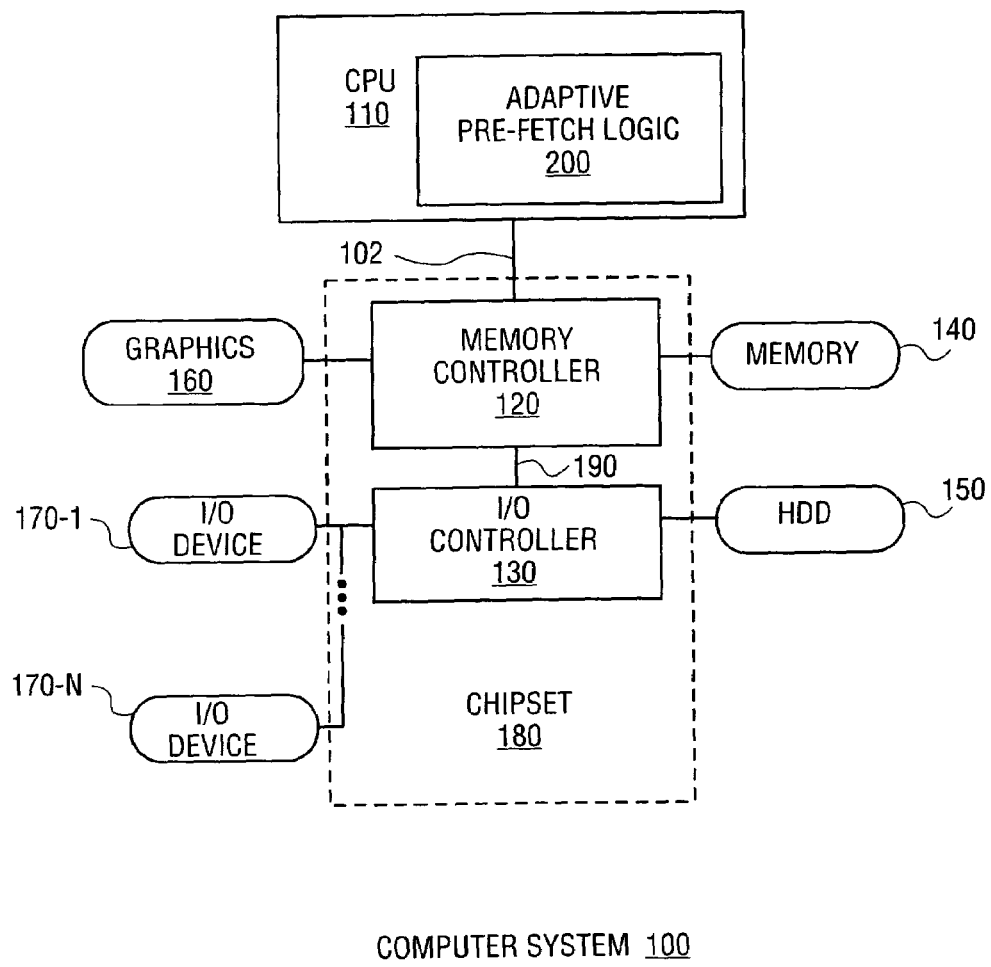
FIG. 1 is a block diagram illustrating a computer system including adaptive prefetch logic, in accordance with one embodiment of the invention.

FIG. 1 is a block diagram illustrating a computer system including a processor having adaptive prefetch logic 200, in accordance with one embodiment of the invention. Computer system 100 comprises a processor system bus (front side bus (FSB)) 102 for communicating information between a processor (CPU) 110 and a chipset 180 coupled together via FSB 102. As described herein, the term "chipset" is used in a manner well-known to those skilled in the art to collectively describe the various devices coupled to CPU 110 to perform desired system functionality.

Chipset 180 is comprised of a memory controller, or memory controller hub (MCH) 120, as well as an input/output (I/O) controller or I/O controller hub (ICH) 130. Memory controller 120 is coupled to main memory 140 and one or more graphics devices or graphics controller 160. In one embodiment, main memory 140 is volatile memory, including but not limited to, random access memory (RAM), dynamic RAM (DRAM), synchronous DRAM (SDRAM), double data rate (DDR) SDRAM, rambus data RAM (RDRAM) or the like. In addition, hard disk drive devices (HDD) 150 and I/O devices 170 (170-1, . . . , 170-N) are coupled to I/O controller 130. Adaptive prefetch logic 200 is further illustrated with reference to FIG. 2.

Figure 2:
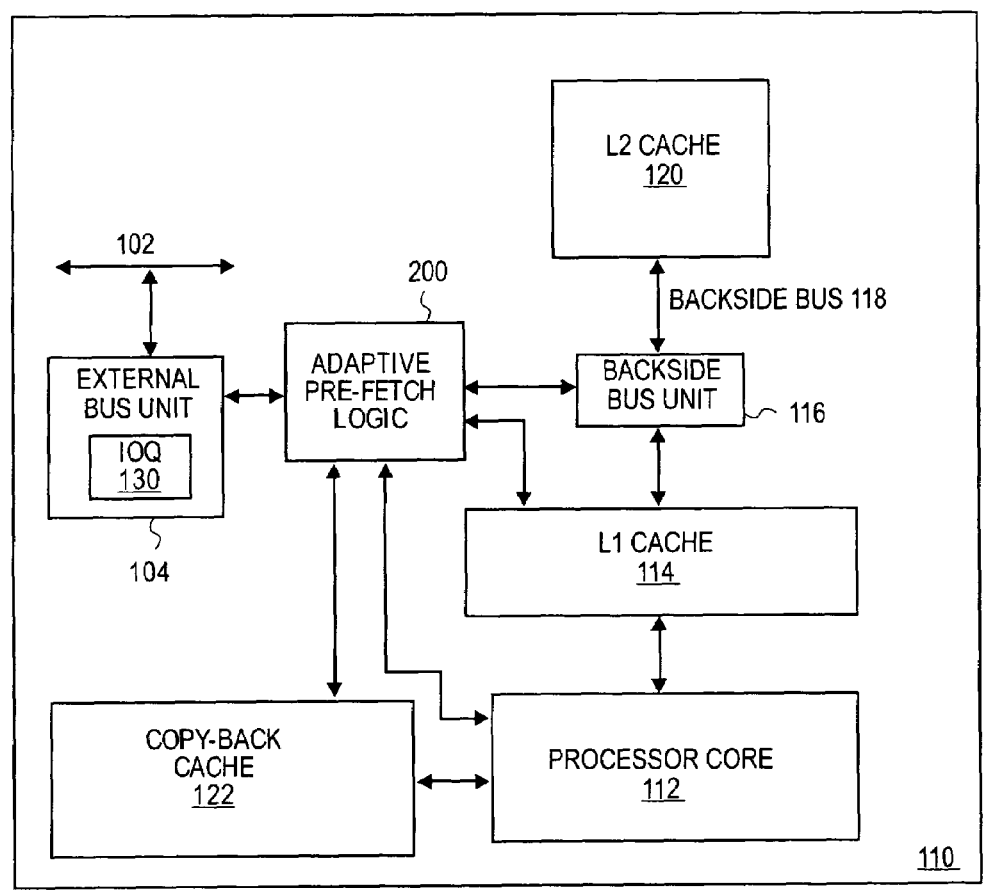
FIG. 2 is a block diagram further illustrating a processor of FIG. 1, in accordance with the further embodiment of the invention.

FIG. 2 further illustrates CPU 110 of FIG. 1 to further describe adaptive prefetch logic 200. CPU 110 is comprised of processor core 112, which may include, for example, copy-back cache (not shown), as well as level one cache (L1) 114 for high speed temporary storage of data. In addition, processor or CPU 110 may include level two cache (L2) 120 as well as copy-back cache 122. As illustrated, L2 cache 120 is off chip memory coupled to backside bus unit 116 via, for example, backside bus 118. CPU 110 includes external bus unit 104 for interfacing with FSB 102 (FIG. 1) including in-order queue (IOQ) 130, as described below. However, in contrast to conventional CPUs, CPU 110 includes adaptive prefetch logic 200.

In one embodiment, adaptive prefetch logic 200 enables CPU 110 to adaptively change prefetching depth according to, for example, a memory subsystem response level to enable improved data prefetching, instruction prefetching, page address prefetching or other like prefetching. As described herein, memory subsystem response is dependent on the level at which memory is being utilized: zero percent usage means the memory subsystem is idle, whereas one hundred percent response means the memory subsystem is running at full capacity or at a maximum throughput level. As described herein, memory system response may be determined according to, for example, a detected memory subsystem occupancy level, a detected memory subsystem latency level or other like memory subsystem level.

level. Accordingly, as described herein, "prefetch throttling" is performed dynamically as memory system occupancy or latency level changes are detected according to current prefetch depth levels.

As indicated above, traditional prefetch mechanisms aim to accurately predict which memory lines will be requested in the future based on what has been recently requested. However, prefetching can rapidly increase the memory subsystem usage (for data prefetching at high prefetch depths) to the point that system performance falls below a level achieved without prefetching. Observation of the relationship between memory subsystem usage and memory latency suggests that most memory subsystems experience a rather notable inflection point. Increasing memory usage from near zero up to the inflection point results in a negligible increase in memory latency. However, after usage reaches the inflection point, further usage increases cause substantial and growing increases in memory latency.

Despite the exponential-like relation between usage and latency, using a system parameter directly related to subsystem usage, such as throughput or bus usage, as an indication of when to enable, disable or adjust the level of prefetching has major drawbacks. For instance, it penalizes memory subsystems designed to sustain high throughput rates at reasonable performance more than poorly designed subsystems that experience their inflection point at lower throughput rates. Rather, the use of memory subsystem occupancy allows the targeting of latency without having to actually track latency directly. Either latency or occupancy can be used with equal effectiveness.

Accordingly, as depicted with reference to FIG. 2, adaptive prefetch logic or dynamic adaptive multi-line prefetcher (DAMP) 200 is a prefetcher that can adaptively change prefetching depth (prefetch throttling). In one embodiment, prefetching depth refers to the number of memory lines to be prefetched from system memory. The prefetching depth is adaptively adjusted (throttled) according to detected memory subsystem response levels. Once altered, subsequent prefetching is performed according to an adjusted (new) prefetch depth. In the embodiments described, the control variable for adjusting the prefetching depth is memory subsystem response. However, in an alternative embodiment, bus occupancy levels as well as latency levels may be used to adaptively change the prefetch depth.

TABLE 1

|  |  | Bus Usage (%) | | | | | | | | |
|---|---|---|---|---|---|---|---|---|---|---|
|  |  | 0.1 | 0.2 | 0.3 | 0.4 | 0.5 | 0.6 | 0.7 | 0.8 | 0.9 | 1 |
| Latency (bus clocks) | 10 | 0.50 | 1.00 | 1.50 | 2.00 | 2.50 | 3.00 | 3.50 | 4.00 | 4.50 | 5.00 |
|  | 15 | 0.75 | 1.50 | 2.25 | 3.00 | 3.75 | 4.50 | 5.25 | 6.00 | 6.75 | 7.50 |
|  | 20 | 1.00 | 2.00 | 3.00 | 4.00 | 5.00 | 6.00 | 7.00 | 8.00 | 9.00 | 10.00 |
|  | 25 | 1.25 | 2.50 | 3.75 | 5.00 | 6.25 | 7.50 | 8.75 | 10.00 | 11.25 | 12.50 |
|  | 30 | 1.50 | 3.00 | 4.50 | 6.00 | 7.50 | 9.00 | 10.50 | 12.00 | 13.50 | 15.00 |

OCCUPANCY LEVEL

As described herein, memory system occupancy refers to a count of pending bus transactions awaiting completion. Likewise, memory subsystem latency level refers to a delay experience by issued transactions (memory requests) awaiting execution. Accordingly, in one embodiment, the prefetching depth, or number of lines prefetched, is adjusted according to a detected memory subsystem occupancy level. In an alternative embodiment, the prefetching depth is adjusted according to a detected memory subsystem latency In one embodiment, one or more prefetching depths levels may be determined by evaluating memory subsystem occupancy over a broad range of latency and bus usage levels to identify an inflection point, for example, as provided in Table 1. Table 1 provides memory subsystem occupancy levels for bus usages from 10% (0.1) to 100% (1) and for latencies from 10 bus cycles to 30 bus cycles. For example, a subsystem occupancy of 5 could be selected to achieve 100% of possible throughput when latency is low (10 bus clocks) without prefetch throttling. As a result, a subsystem occupancy of 5 causes prefetch throttling at higher latencies. Accordingly, prefetch throttling would start at 50% bus usage when latency is 20 bus clocks. In other words, at 50% bus usage, prefetch throttling begins when latency reaches 20 bus clocks.

Figure 3:
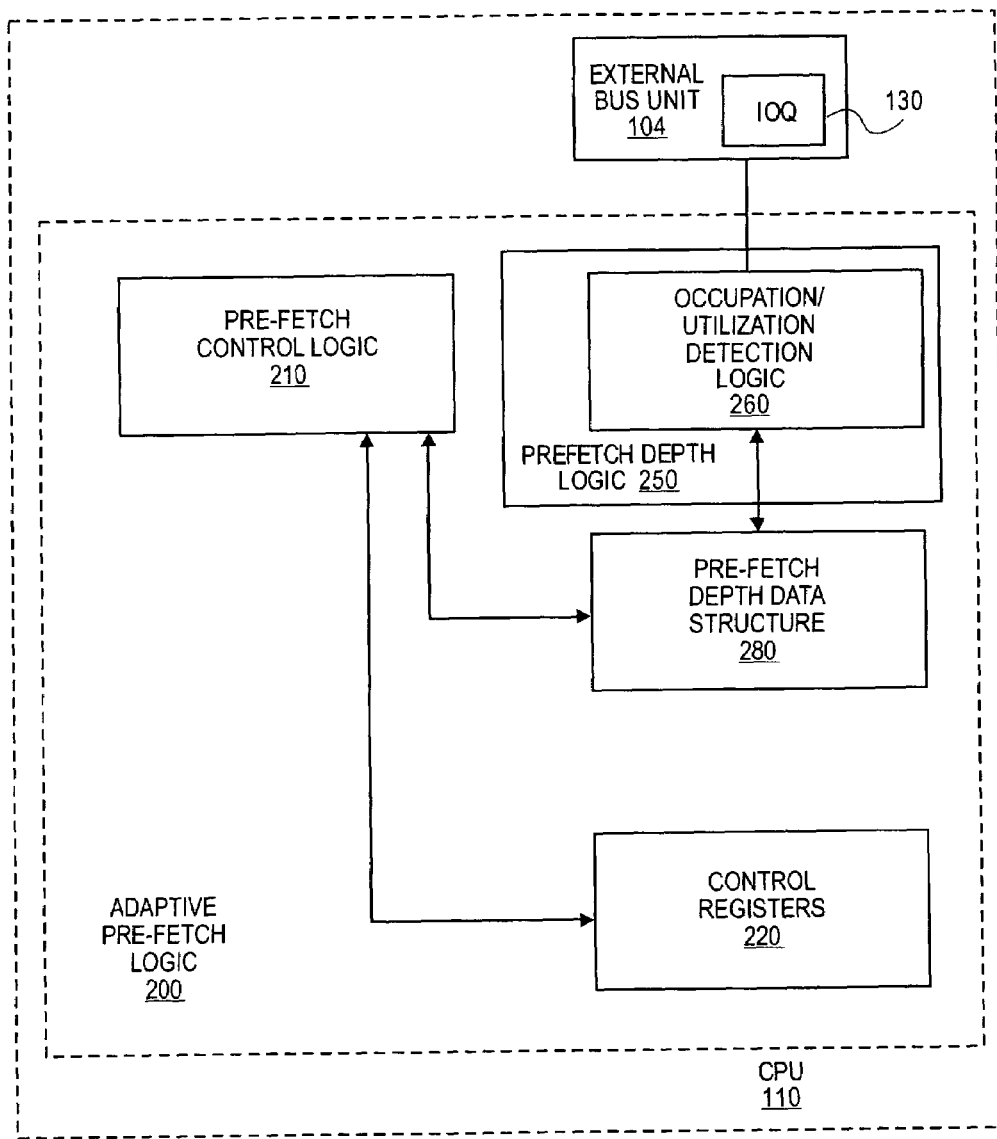
FIG. 3 is a block diagram illustrating adaptive prefetch logic, in accordance with one embodiment of the invention.

FIG. 3 illustrates adaptive prefetch logic 200 to provide dynamic control logic that optimizes the performance of simple linear prefetching memory throughput and memory latency. Logic 200 addresses key issues with current practice by adjusting memory subsystem demand to avoid negative performance impacts caused by either always performing prefetching or never performing prefetching. The main cause of poor prefetching performance, when usage prediction is reasonably good, is the increase in memory latency for non-prefetch loads. On most systems, at low throughput levels, a relatively large change in throughout will not have a significant impact on latency. However, at higher throughput levels, a small change in throughput will cause a large increase in latency.

As illustrated, adaptive prefetch logic 200 is comprised of prefetch control logic 210 as well as prefetch depth logic 250, which includes occupancy/latency detection logic 260. Accordingly, when CPU control registers 220 indicate that multiple line prefetching is enabled, control logic 210 looks up the number of lines to prefetch in a table, such as, for example, prefetch depth data structure 280. In one embodiment, a table may be generated, including an entry for each prefetch depth that is desired. In addition, each entry includes a valid bit. In one embodiment, a prefetch table may be formed, for example, as depicted in Table 2.

TABLE 2

| Valid (1 bit) | Number of Additional Sector (2 bits) | Subsystem Occupancy Deactivate (N bits) | Subsystem Occupancy Activate (N bits) | Notes |
|---|---|---|---|---|
| 1 | 01 | 101 | 100 | Level 3, Fetch 01h additional line |
| 0 | 10 | 011 | 010 | Level 2, Fetch 10h additional lines |
| 0 | 11 | 001 | 000 | Level 1, Fetch 11h additional lines |

Accordingly, prefetch depth detection logic 250 dynamically adjusts the valid bits for each of the table entries to control the level of prefetch. In one embodiment, prefetch control logic 210 uses Table 2 to determine the number of lines to prefetch. If no entry is valid, CPU 110 will not perform prefetching. However, if a valid entry is identified, that entry indicates the number of lines to prefetch. In one embodiment, no more than one entry in the indicated table should be valid at any one time.

Detection logic 260 checks memory subsystem requests to generate an average occupancy for a given time. To generate the average occupancy, each bus clock, the number of outstanding memory subsystem requests may be added to a register 220. At the end of the time interval, this counter is divided by the time interval, in bus clocks, according to the following equation:

$$\mu=[\Sigma n]/(t) \tag{1}$$

In Equation 1, the average memory subsystem occupancy (μ) is provided in the time interval zero τ, where N represents the number of requests. Prefetch depth logic 250 uses the occupancy level to decide which, if any, valid bits in the prefetch data structure, such as, for example, Table 2 as described above, should be asserted. In one embodiment, the selecting of an entry within prefetch data structure 280 is performed by comparing a detected occupancy level against occupancy activation and deactivations of levels of the prefetch depths listed in prefetch data structure 280 (See Table 2). Once a prefetch depth is selected, a valid bit of a row containing the selected prefetch depth is set.

$$\Lambda=[\Sigma n]/(\#R) \tag{2}$$

In an alternative embodiment, the prefetch depth is adjusted according to a memory subsystem latency level detected according to equation (2). In equation (2) a memory subsystem latency level (Λ), where N represents the total number of outstanding memory request within a selected time interval, while #R represents a count of the number of memory request received during the time interval. Accordingly, activation as well as deactivation latency level could be determined and stored within prefetch data structure as described above with reference to Table 2.

In one embodiment, detection logic 260 may determine either a memory subsystem occupancy level or, in an alternative embodiment, a memory subsystem latency level utilizing, for example, in order queue (IOQ) 130, as depicted in FIGS. 2 and 3. Referring again to FIG. 1, all devices that reside on FSB 102 are referred to as bus agents, which are required to arbitrate for bus ownership in order to issue bus transactions to issue a request to a bus agent. In one embodiment, the term "bus transaction" is defined as activity related to a single bus access request.

According to an FSB protocol, such as, for example, the Pentium® 4 FSB Protocol or other follow-up processor protocol manufactured by the Intel Corporation of Santa Clara, Calif., bus agents may be identified as either priority agents or symmetric agents, such that, as the name might indicate, priority bus agents are given priority for establishing bus ownership for issuing transaction requests. As such, the various devices coupled to FSB 102 arbitrate for bus ownership and once ownership is granted, issue transactions, such as memory requests to system memory 140.

In order to properly interact with FSB 102 at each stage of an issued transaction, each agent maintains an IOQ. IOQ 130 contains all pending FSB transactions independently issued by a transaction requester. Thus, in any agent IOQ, all current transactions can be found. In addition, the IOQ may contain information indicating initial placement of the transaction within the IOQ as well as an indication of when the transaction was serviced. Furthermore, a queue size (depth) of IOQ 130 indicates a count of the number of outstanding bus transactions.

Accordingly, based on this information, detection logic 260 may track the IOQ depth to identify a count of current memory requests in order to determine a memory subsystem occupancy level, as well as memory subsystem latency levels. This latency/occupancy level may be utilized by prefetched depth logic 250 to adjust the prefetch depth in order to avoid undue system latency, such that subsequent prefetch is performed according to an adjusted prefetch depth. Alternatively, if a system transaction has a significant portion of out-of-order (rescheduled) transactions, latency/occupancy is determined according to a transaction scheduler that controls the initialization and completion of all bus transactions.

In the embodiments described, adaptive prefetch is illustrated with reference to CPU 110. However, those skilled in the art will recognize that adaptive prefetch may be performed within any bus agent in accordance with the embodiments described. Adaptive prefetching, as described herein my be used within point-to-point (link based) system topologies, embedded memory controllers or the like. For example, the adaptive prefetching could be performed within a memory controller by prefetching DRAM data into a local cache, to allow more rapid service for memory requests. Procedural methods for implementing embodiments of the present invention are now described.

Operation

Figure 4:
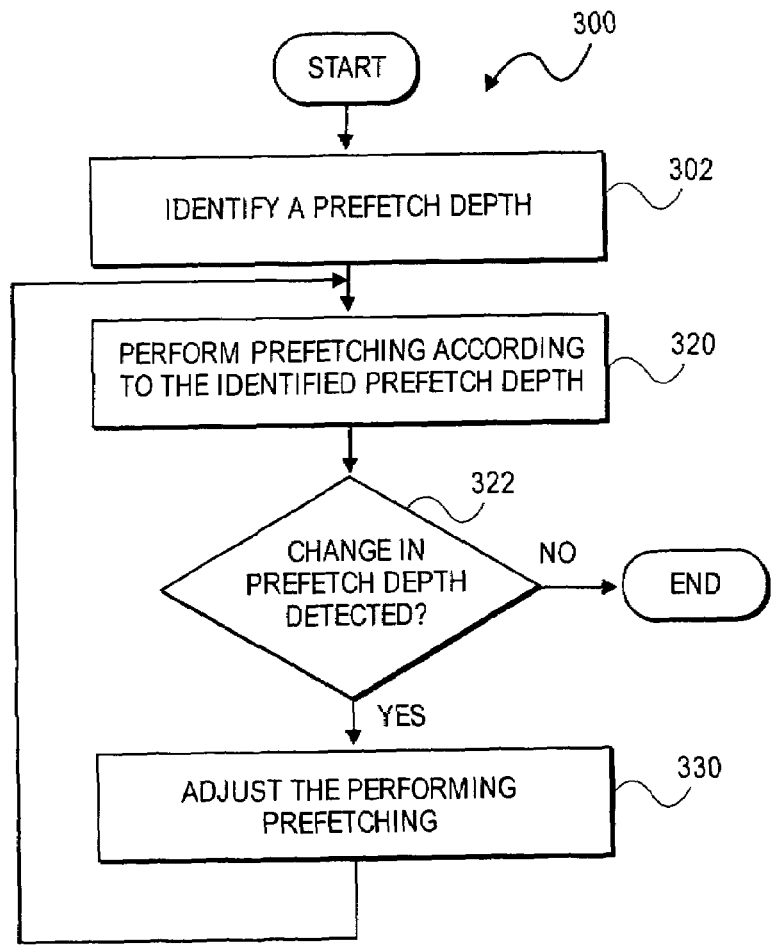
FIG. 4 is a flowchart illustrating a method for performing adaptive multi-line prefetching according to an identified pre-fetch depth, in accordance with one embodiment of the invention.

FIG. 4 is a block diagram illustrating a method 300 for dynamically adjusting a prefetch depth according to a memory subsystem response level, in accordance with one embodiment of the invention. The use of a prefetching mechanism allows the loading of data into cache memory prior to processor requests for the data. As a result, the effective latency of memory requests is lowered. Fundamental to the nature of prefetching is an increase in the memory subsystem throughput. This increase in throughput is not harmful in and of itself. Rather, the increase in latency for those processor requests that still miss the cache is the problem.

As a result, basing the throttling mechanism on latency rather than throughput is important. In one embodiment, the prefetching depth is dynamically adjusted according to a calculated memory system occupancy level. In an alternative embodiment, memory latency may be monitored to determine an average memory latency and based on the detected latency, the prefetching depth is adjusted, thereby lowering the effective latency for memory requests.

Referring again to FIG. 4, at process block 302, a prefetch depth is identified. In one embodiment, the prefetch depth is identified by querying a control register, such as, for example, control register 220, to determine whether multi-line prefetching is enabled. When multi-line prefetching is enabled, a data structure, such as, for example, prefetch data structure 280 of FIG. 3 may be searched to determine a current prefetch depth. Once the prefetch depth is identified, prefetching is performed according to the identified prefetch depth at process block 320. At process block 322, it is determined whether a change to the prefetch depth is detected.

In other words, it is determined whether a change to the prefetch data structure, and specifically the identification of a new or updated prefetch depth is detected. When such is detected, at process block 330, a prefetching of process block 320 is adjusted, such that prefetching is performed according to a new prefetch depth. In an alternative embodiment, prefetch control logic 210 (FIG. 3) performs subsequent data prefetching (next prefetch cycle) according to the new prefetch depth by querying prefetch data structure 280, prior to each prefetch cycle, to read a current prefetch depth selected by prefetch depth logic 250.

Figure 5:
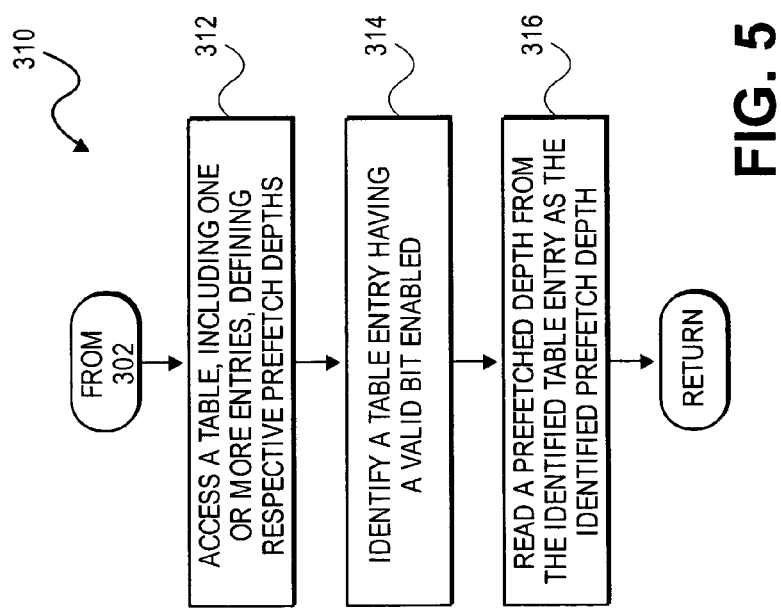
FIG. 5 is a flowchart illustrating a method for identifying a current prefetch depth, in accordance with one embodiment of the invention.

FIG. 5 is a flowchart illustrating a method 310 for identifying a prefetch depth of process block 302 of FIG. 4, in accordance with one embodiment of the invention. At process block 312, a table is accessed, which includes one or more entries defining respective prefetch depths. At process block 314, a table entry is identified having a valid bit enabled or set. As described herein, the terms "set", "setting", "enable", "enabling", "asserting", "assert", and the like, do not imply active high logic. The terms may include, for example, active low logic such that driving a zero value results in an assertion of a signal line or setting of a bit value.

In an alternative embodiment, an active high architecture or active high logic may also be included while remaining within the scope of the embodiments of the invention. For example, as illustrated with reference to Table 2, prefetch control logic may analyze a valid bit of each table entry within Table 2 to identify an entry having a set valid bit. As illustrated in Table 1, prefetch level 3 is currently active. Accordingly, at process block 316, a prefetch depth is read from the identified table entry and is used as the identified prefetch depth of process block 302 of FIG. 4.

Figure 6:
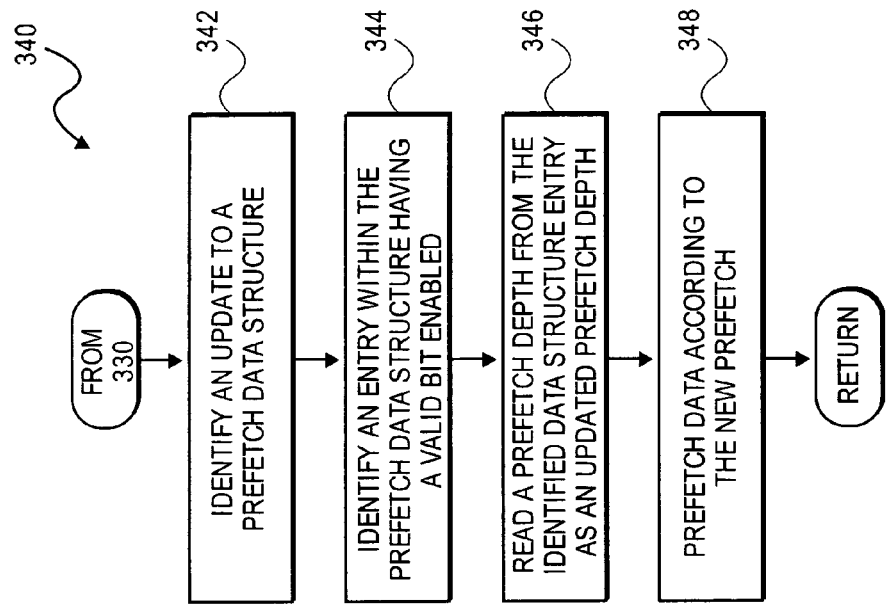
FIG. 6 is a flowchart illustrating a method for adjusting prefetching when a change in prefetch depth is detected, in accordance with one embodiment of the invention.

FIG. 6 is a flowchart illustrating a method 340 for adjusting performing of prefetching of process block 330, in accordance with one embodiment of the invention. At process block 342, an update to the prefetch data structure is identified. Once identified, at process block 344, an entry within the prefetch data structure is identified as having a valid bit enabled. Once identified, at process block 346, a prefetch depth is read from the identified data structure as an updated prefetch depth. At process block 348, prefetching is performed according to the new or updated prefetch depth. In an alternative embodiment, if each entry within the prefetch data structure is disabled, prefetching is temporarily disabled until an update to the prefetch data structure is detected, which enables a bit value of a selected prefetch depth.

Figure 7:
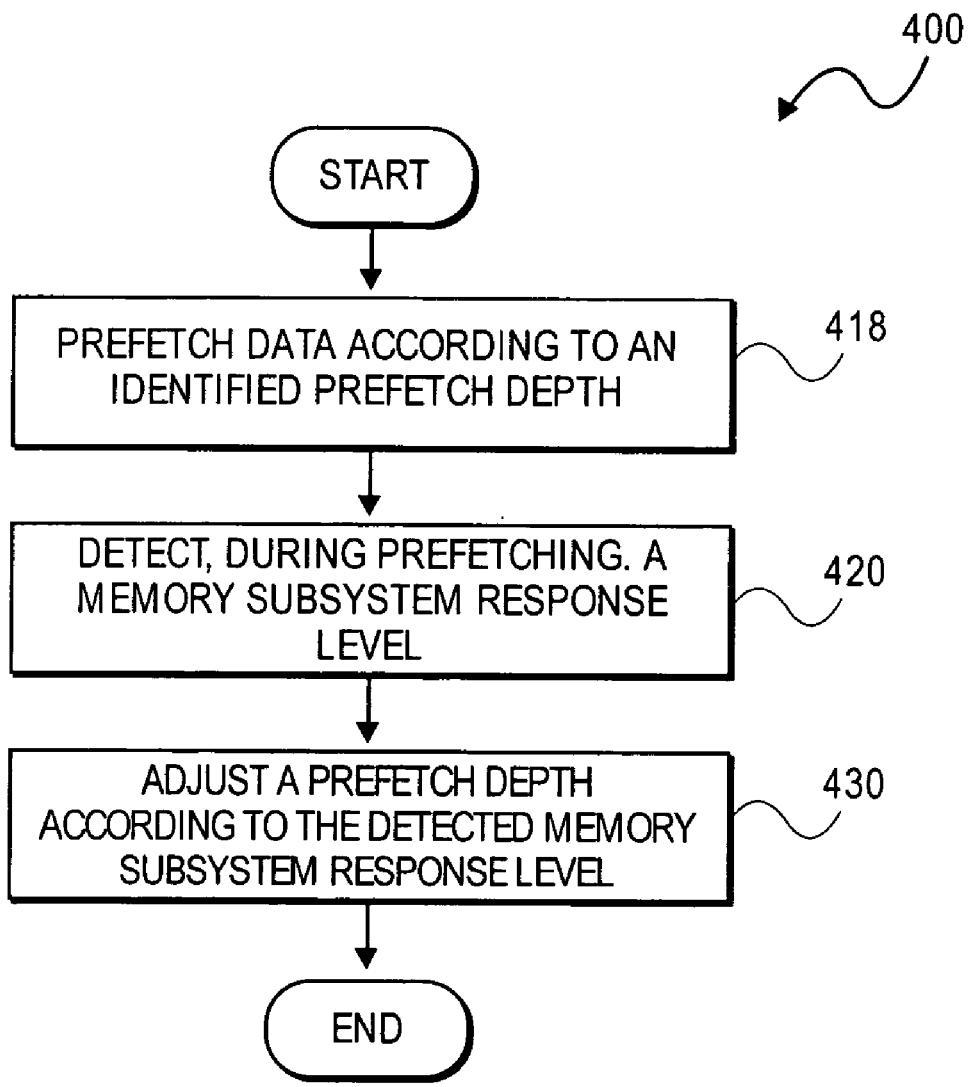
FIG. 7 is a flowchart illustrating a method for adjusting a current prefetch depth according to a detected memory subsystem response level, in accordance with one embodiment of the invention.

FIG. 7 is a flowchart illustrating a method 400 for adjusting a prefetch depth according to a detected memory subsystem response level, in accordance with one embodiment of the invention. At process block 418, data is prefetched according to an identified prefetch depth, such as, for example, detected from prefetch data structure 280 (FIG. 3). At process block 420, a memory subsystem response level is detected during prefetching at process block 418. At process block 430, a prefetch depth is adjusted according to the detected memory subsystem response level. For example, if the detected subsystem response level is high or in excess of a system inflection point, prefetching is throttled such that a lower prefetching or smaller prefetching depth is selected, such that subsequent prefetch is performed according to the new prefetch depth.

Alternatively, if the subsystem response level is found to be low, the prefetch depth may be increased according to values indicated within prefetch data structure 280. For example, formation of a prefetch data structure, such as Table 2, requires the determination of one or more prefetch depths using, for example, the values contained in Table 1 and desired memory subsystem occupancy levels. Once such prefetch depths are identified, an entry is generated within the prefetch data structure for each determined prefetch depth. Likewise, a validity bit is also generated for each entry in order to enable the selection of a prefetch depth by, for example, prefetch depth logic 250 (FIG. 3).

Figure 8:
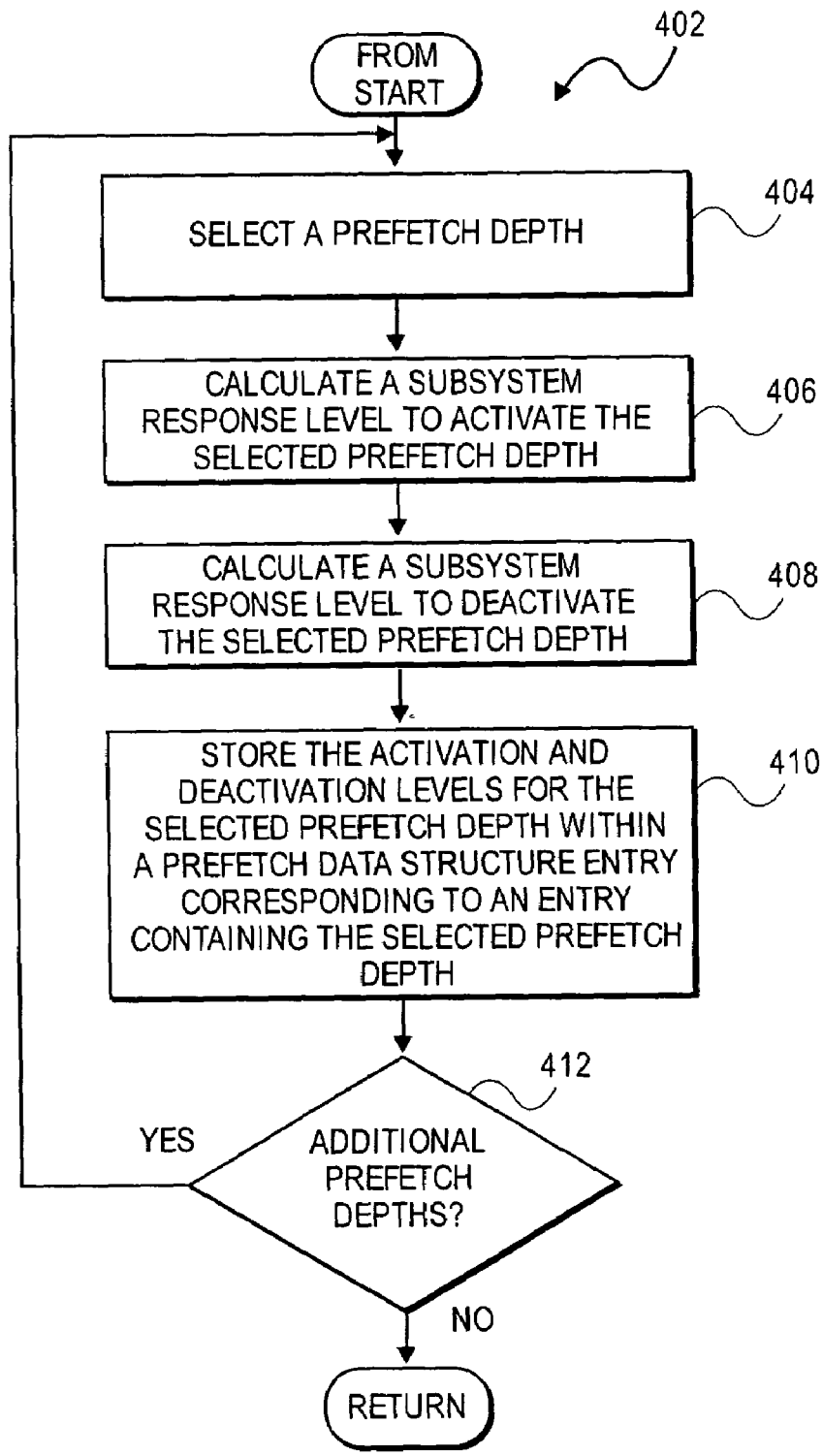
FIG. 8 is a flowchart illustrating a method for calculating activation and deactivation levels for one or more pre-selected prefetch depths, in accordance with one embodiment of the invention.

FIG. 8 is a flowchart illustrating a method 402, which is performed prior to adjusting of the prefetch depth according to detected memory subsystem response levels, in accordance with one embodiment of the invention. For example, after selecting the plurality of prefetch depths according to, for example, values contained within Table 1, at process block 404, a prefetch depth is selected. Once selected, at process block 406, a subsystem response level is calculated to activate the selected prefetch depth.

At process block 408, the subsystem response level to deactivate the selected prefetch depth is also calculated. In one embodiment, these values may be calculated, for example, using values contained within Table 1, as described above, memory subsystem occupancy activation and deactivation levels (See Table 2). At process block 410, the activation/deactivation levels for the selected prefetch depth are stored within a prefetch data structure entry corresponding to an entry containing the selected prefetch depth. At process block 412, process blocks 404–410 are repeated for each predetermined prefetch depth.

Figure 9:
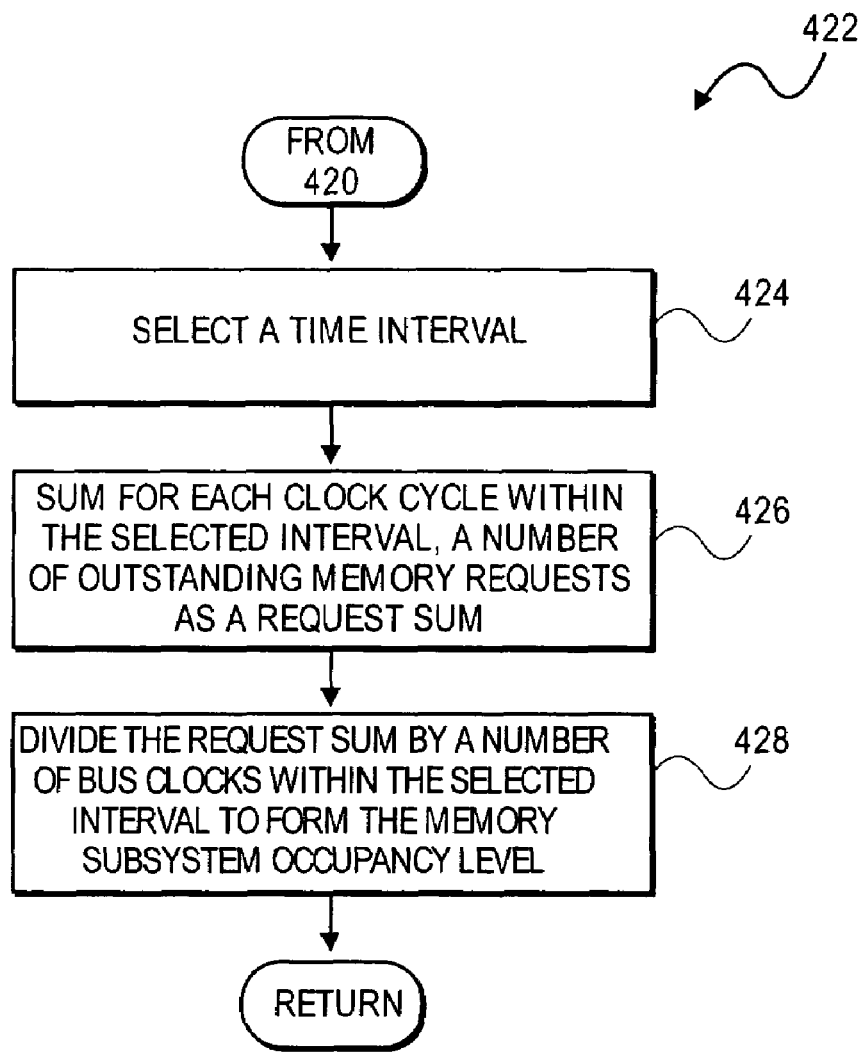
FIG. 9 is a flowchart illustrating a method for calculating an average memory occupancy level, in accordance with one embodiment of the invention.

FIG. 9 is a flowchart illustrating a method 422 for calculating an average memory subsystem occupancy levels in order to adjust or select a new prefetch depth, in accordance with one embodiment of the invention. This may be performed by tracking memory subsystem requests and based on the tracking, an average memory occupancy level may be determined as the memory subsystem response level. Accordingly, at process block 424, a time interval is selected. Once selected, at process block 426, a sum is calculated for each clock cycle within the interval of a number of outstanding memory requests to form a request sum.

In one embodiment, the number of outstanding memory requests is determined according to a current depth of an in-order (IOQ) 130 (FIG. 3). As described above, IOQ 130 is a mechanism for identifying current bus transactions awaiting execution. In addition, the IOQ contains a record of initial placement of a transaction within the IOQ, as well as an indication of when the transaction was serviced. Accordingly, based on the current number of transactions contained within the IOQ, a sum may be taken over the selected interval. As such, at process block 428, the request sum is divided by a number of bus clocks within the selected interval to form the memory's subsystem occupancy level to determine memory subsystem response levels.

Figure 10:
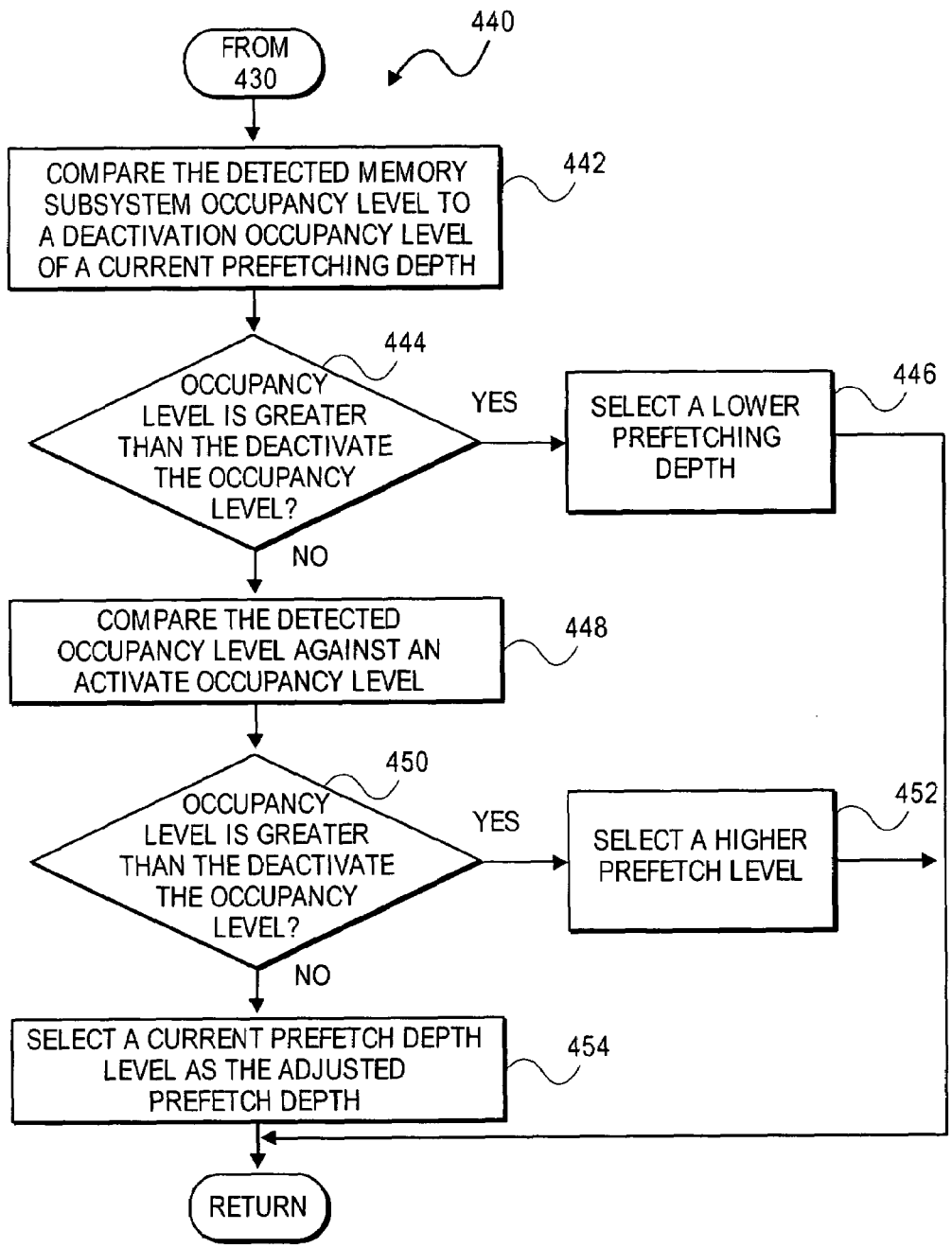
FIG. 10 is a flowchart illustrating a method for selecting a new prefetch depth according to a detected memory subsystem response level, in accordance with one embodiment of the invention.

FIG. 10 is a flowchart illustrating a method 440 for selecting a new prefetch depth according to a detected memory occupancy level. At process block 442, the detected memory subsystem occupancy level is compared to a deactivation occupancy level of a current prefetch depth. At process block 444, it is determined whether the detected occupancy level is greater than the deactivation occupancy level of the current prefetch depth. When such is the case, at process block 444, a lower or previous prefetch depth is selected at process block 446.

For example, within Table 2, if the current occupancy level exceeded the deactivation level of level 3 prefetch, prefetching would be deactivated. However, if level 2 prefetch was currently valid, and the current occupancy level exceeded the occupancy deactivation level of the level 2 prefetch, level 3 prefetch would be selected.

At process block 448, the detected occupancy level is compared against an activation occupancy level of the current prefetch depth. At process block 450, it is determined whether the detected occupancy level is less than an activate occupancy level of the current prefetch depth. When such is the case, a higher prefetch level is selected. For example, based on Table 2, if process block 450 is true, level 2 prefetch depth is selected. Otherwise, at process block 454, a current prefetch depth is selected as the adjusted prefetch depth.

In an alternative embodiment, subsystem memory requests may be tracked to generate an average latency for a given time interval. For example, as indicated above, IOQ generally contains an indication of when a transaction was initially placed within the queue and the amount of time required to service the transaction. Accordingly, for memory read requests, as well as memory write requests, the initial placement time and the service time of each transaction within the IOQ may be compared to determine an average latency. Based on such latency, the prefetch depth may be adjusted such that the prefetch depth is reduced when the latency is high and conversely increased when the latency is low. In an alternative embodiment, a transaction scheduler is queried to determine either occupancy or latency levels.

Figure 11:
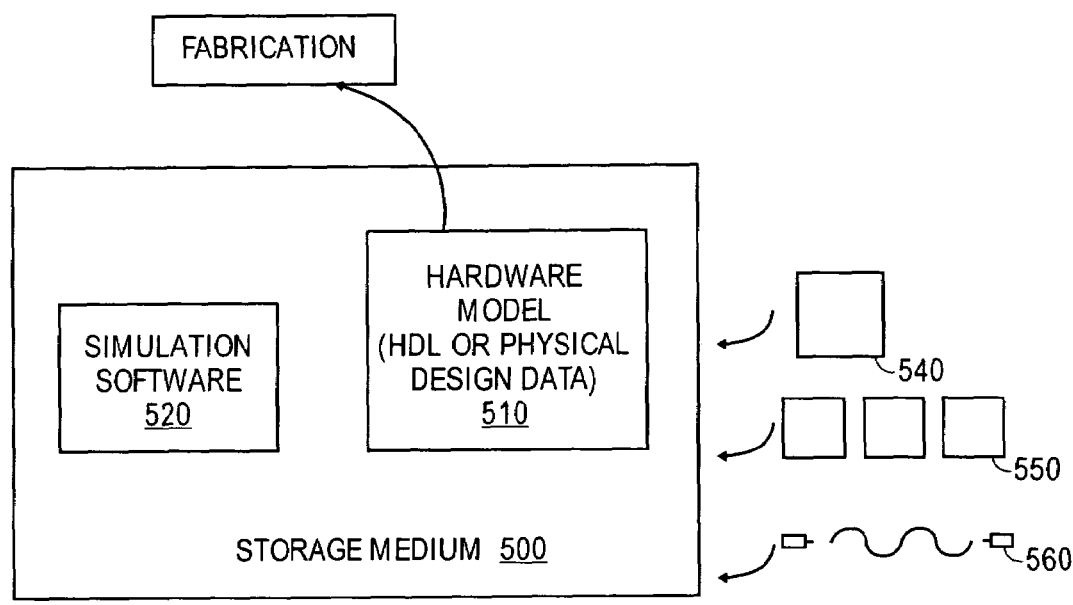
FIG. 11 is a block diagram illustrating various design representations or formats for simulation, emulation and fabrication of a design using the disclosed techniques.

FIG. 11 is a block diagram illustrating various representations or formats for simulation, emulation and fabrication of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 510 may be stored in a storage medium 500, such as a computer memory, so that the model may be simulated using simulation software 520 that applies a particular test suite 530 to the hardware model to determine if it indeed functions as intended. In some embodiments, the simulation software is not recorded, captured or contained in the medium.

Additionally, a circuit level model with logic and/or transistor gates may be produced at some stages of the design process. The model may be similarly simulated some times by dedicated hardware simulators that form the model using programmable logic. This type of simulation taken a degree further may be an emulation technique. In any case, reconfigurable hardware is another embodiment that may involve a machine readable medium storing a model employing the disclosed techniques.

Furthermore, most designs at some stage reach a level of data representing the physical placements of various devices in the hardware model. In the case where conventional semiconductor fabrication techniques are used, the data representing the hardware model may be data specifying the presence or absence of various features on different mask layers or masks used to produce the integrated circuit. Again, this data representing the integrated circuit embodies the techniques disclosed in that the circuitry logic and the data can be simulated or fabricated to perform these techniques.

In any representation of the design, the data may be stored in any form of a machine readable medium. An optical or electrical wave 560 modulated or otherwise generated to transport such information, a memory 550 or a magnetic or optical storage 540, such as a disk, may be the machine readable medium. Any of these mediums may carry the design information. The term "carry" (e.g., a machine readable medium carrying information) thus covers information stored on a storage device or information encoded or modulated into or onto a carrier wave. The set of bits describing the design or a particular of the design are (when embodied in a machine readable medium, such as a carrier or storage medium) an article that may be sealed in and out of itself, or used by others for further design or fabrication.

Accordingly, the dynamic adaptive multi-line prefetching mechanism described herein promotes higher system performed by the use of a more efficient prefetching mechanism. This technique works with symmetric multiprocessor (SMP) systems, as well as chip multiprocessor (CMP) systems, that have a greater potential for bus congestion. The mechanism is also used with existing and future core prefetchers since the dynamic adaptive multi-line prefetching is driven, in part, by the core prefetcher, but will adjust the amount of prefetching based on, for example, memory occupancy and provide latency sensitivity. In addition, the techniques described overcome a lack of scaling caused by overly aggressive prefetching.

Alternate Embodiments

It will be appreciated that, for other embodiments, a different system configuration may be used. For example, while the system 100 includes a single CPU 110, for other embodiments, a multiprocessor system (where one or more processors may be similar in configuration and operation to the CPU 110 described above) may benefit from the adaptive prefetching of various embodiments. Further different type of system or different type of computer system such as, for example, a server, a workstation, a desktop computer system, a gaming system, an embedded computer system, a blade server, etc., may be used for other embodiments.

Having disclosed exemplary embodiments and the best mode, modifications and variations may be made to the disclosed embodiments while remaining within the scope of the embodiments of the invention as defined by the following claims.

What is claimed is:

1. A method comprising:
   identifying a prefetch depth;
   tracking memory subsystem requests;
   selecting a time interval;
   summing, for each clock cycle within the selected interval, a number of outstanding memory requests as a request sum;
   dividing the request sum by a number of bus clocks within the selected interval to form an average memory subsystem occupancy level for the interval to track the average memory subsystem occupancy level as a memory subsystem response level according to the memory subsystem requests to detect the memory subsystem response level according to at least one bus transaction directed to a main memory;
   prefetching data according to an adjusted prefetch depth; and
   adjusting the prefetch depth according to the detected memory subsystem response level.

2. The method of claim 1, wherein the method further comprises, prior to identifying the prefetch depth:
   querying a control register to determine whether prefetching is enabled; and
   querying a data structure to identify a current prefetch depth as the identified prefetch depth if prefetching is enabled.

3. The method of claim 2, wherein querying the data structure comprising:
   accessing a table, including one or more entries, defining respective prefetch depths;
   identifying a table entry having a valid bit enabled; and
   reading a prefetched depth from the identified table entry as the identified prefetch depth.

4. The method of claim 1, wherein prefetching comprises:
   reading at least one data line from the main memory according to the identified prefetch depth.

5. The method of claim 1, wherein adjusting the prefetch depth comprises:
   identifying an update to a prefetch data structure;
   identifying an entry within the prefetch data structure having a valid bit enabled;
   reading a prefetch depth from the identified data structure entry as an updated prefetch depth; and
   prefetching data according to the updated prefetch depth.

6. An article of manufacture including a machine readable medium having stored thereon instructions which may be used to program a system to perform a method, comprising:
   identifying a prefetch depth;
   tracking memory subsystem requests;
   selecting a time interval;
   summing, for each clock cycle within the selected interval, a number of outstanding memory requests as a request sum;
   dividing the request sum by a number of bus clocks within the selected interval to form an average memory subsystem occupancy level for the interval to track the average memory subsystem occupancy level as a memory subsystem response level according to the memory subsystem requests to detect the memory subsystem response level according to at least one bus transaction directed to a main memory;
   prefetching data according to an adjusted prefetch depth; and
   adjusting the prefetch depth according to the detected memory subsystem response level.

7. The article of manufacture of claim 6, wherein the method further comprises, prior to, identifying the prefetch depth:
   querying a control register to determine whether prefetching is enabled; and
   querying a data structure to identify a current prefetch depth as the identified prefetch depth if prefetching is enabled.

8. The article of manufacture of claim 7, wherein querying the data structure comprising:
   accessing a table, including one or more entries, defining respective prefetch depths;
   identifying a table entry having a valid bit enabled; and
   reading a prefetched depth from the identified table entry as the identified prefetch depth.

9. The article of manufacture of claim 6, wherein prefetching comprises:
   reading at least one data line from the main memory according to the identified prefetch depth.

10. The article of manufacture of claim 6, wherein adjusting the prefetching comprises:
    identifying an update to a prefetch data structure;
    identifying an entry within the prefetch data structure having a valid bit enabled;
    reading a prefetch depth from the identified data structure entry as an updated prefetch depth; and
    prefetching data according to the updated prefetch depth.

11. A method comprising:
    determining one or more prefetch depths;
    selecting a prefetch depth;
    calculating a memory subsystem response level to activate the selected prefetch depth;
    calculating a memory subsystem response level to deactivate the selected prefetch depth;
    storing the activation and deactivation levels for the selected prefetch depth within a prefetch data structure entry corresponding to an entry containing the selected prefetch depth;
    repeating the selecting, calculating the subsystem occupancy deactivation level, calculating the subsystem activation level and storing the activation and deactivation level for each selected prefetch depth;
    generating a validity bit entry for each respective prefetch depth entry in the prefetch data structure;
    selecting a prefetch depth by enabling a validity bit of an entry within the prefetched data structure corresponding to a selected prefetch depth;
    detecting a memory subsystem response level according to at least one bus transaction directed to a main memory; and
    adjusting the selected prefetch depth according to the detected memory subsystem response level.

12. The method of claim 11, wherein detecting the memory subsystem response level comprises:
    tracking memory subsystem requests; and tracking an average memory occupancy level as a memory subsystem response level according to the memory subsystem requests.

13. The method of claim 12, wherein tracking the average memory occupancy level comprises:
selecting a time interval;
summing for each clock cycle within the selected interval, a number of outstanding memory requests as a request sum; and
dividing the request sum by a number of bus clocks within the selected interval to form the average memory subsystem occupancy level for the interval.

14. The method of claim 11, wherein adjusting the prefetching comprises
comparing the detected memory subsystem response level to activation and deactivation occupancy levels of one or more prefetching depths; and
selecting a new prefetching depth according to comparing of the memory of the detected memory subsystem response level.

15. The method of claim 14, wherein selecting comprises:
comparing the detected memory subsystem occupancy level to a deactivation occupancy level of a current prefetching depth;
selecting a lower prefetching depth if the detected occupancy level is greater than the deactivation occupancy level;
otherwise, comparing the detected occupancy level against an activate occupancy level;
selecting a higher prefetch level if the detected occupancy level is less than an activate occupancy level of the current prefetch depth; and
otherwise, selecting a current prefetch depth as the new prefetch depth.

16. The method of claim 12, wherein tracking memory subsystem requests comprises:
determining a depth of an in order queue as the number of outstanding memory subsystem requests.

17. The method of claim 11, wherein detecting the memory subsystem response level comprises:
tracking subsystem memory requests; and
generating an average memory latency level as the memory subsystem response level according to the memory subsystem requests.

18. The method of claim 17, wherein tracking memory subsystem requests comprises:
selecting a time interval;
summing, for each clock cycle within the selected interval, a number of outstanding memory requests as an outstanding request sum; and
summing, for each clock cycle within the selected interval, a number of received memory requests as a received request sum; and
dividing the outstanding request sum by the received request sum to form the average memory subsystem latency level for the interval.

19. An apparatus comprising:
prefetch control logic to identify a prefetch depth, to prefetch data from a main memory to store the prefetch data within a cache memory according to the identified prefetch depth, and to adjust the prefetch of data as changes in prefetch depth are detected;
memory occupancy detection logic to track memory subsystem requests, to select a time interval, to sum for each clock cycle within the selected interval, a number of outstanding memory requests as a request sum and to divide the request sum by a number of bus clocks within the selected interval to form an average memory subsystem occupancy level for the interval; and
prefetch depth logic to track the average memory subsystem occupancy level as a memory subsystem response level according to the memory subsystem requests to detect the memory subsystem response level according to at least one bus transaction directed to a main memory, and to adjust a prefetch depth according to the detected memory subsystem response level.

20. The apparatus of claim 19, wherein the prefetch control logic to identify an update to a prefetch data structure, to identify an entry within the prefetch data structure having a valid bit enabled, to read a prefetch depth from the identified data structure entry as an updated prefetch depth, and to prefetch data according to the new prefetch depth.

21. The apparatus of claim 19, wherein the prefetch depth logic further comprises:
memory latency detection logic to track subsystem memory requests, and generate an average memory latency level as the memory subsystem response level according to the memory subsystem requests.

22. A system comprising:
a memory controller coupled to a main memory; and
a processor coupled to the memory controller, the processor including:
at least one cache memory,
prefetch control logic to identify a prefetch depth, to prefetch data from the main memory to store the prefetch data within the cache memory according to the identified prefetch depth and to adjust the prefetch of data as changes in prefetch depth are detected,
memory occupancy detection logic to track memory subsystem requests to select a time interval, to sum for each clock cycle within the selected interval, a number of outstanding memory requests as a request sum and to divide the request sum by a number of bus clocks within the selected interval to form an average memory subsystem occupancy level for the interval; and
prefetch depth adjustment logic to track the average memory subsystem occupancy level as a memory subsystem response level according to the memory subsystem requests, to detect, during prefetch of data, the memory subsystem response level according to at least one bus transaction directed to the main memory and to adjust a prefetch depth according to the detected memory subsystem response level.

23. The system of claim 22, wherein the prefetch control logic to identify an update to a prefetch data structure, to identify an entry within the prefetch data structure having a valid bit enabled, to read a prefetch depth from the identified data structure entry as an updated prefetch depth, and to prefetch data according to the new prefetch depth.

24. The system of claim 22, wherein the prefetch depth logic further comprises:
memory latency detection logic to track subsystem memory requests, and generate an average memory latency level as the memory subsystem response level according to the memory subsystem requests.

25. The system of claim 22, further comprising:
an input/output controller coupled to the memory controller via an input/output bus.

* * * * *